(12) United States Patent
Virkki et al.

(10) Patent No.: US 8,305,997 B2
(45) Date of Patent: Nov. 6, 2012

(54) DYNAMIC TIME TO TRIGGER FOR UE MEASUREMENTS

(75) Inventors: Vesa Virkki, Jorvas (FI); Jose Luis Pradas, Jorvas (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 580 days.

(21) Appl. No.: 12/401,191

(22) Filed: Mar. 10, 2009

(65) Prior Publication Data

US 2010/0234014 A1   Sep. 16, 2010

(51) Int. Cl.
*H04W 4/00* (2009.01)
*G01R 31/08* (2006.01)
*H04B 7/00* (2006.01)

(52) U.S. Cl. .......... 370/332; 370/241; 370/254; 455/525

(58) Field of Classification Search ............... 370/328, 370/329, 331, 333, 332, 241, 242, 247, 248, 370/251, 252, 395.21; 455/524, 525, 132–135, 455/115.3, 437, 438, 67.11, 550.1, 456.1
See application file for complete search history.

(56) References Cited

U.S. PATENT DOCUMENTS

| | | | |
|---|---|---|---|
| 5,901,226 A * | 5/1999 | Brenner et al. | 455/437 |
| 6,445,917 B1 | 9/2002 | Bark et al. | |
| 7,113,793 B2 * | 9/2006 | Veerasamy et al. | 455/456.1 |
| 7,978,634 B2 * | 7/2011 | Yang et al. | 370/280 |
| 2002/0068566 A1 | 6/2002 | Ohlsson et al. | |
| 2006/0073828 A1 | 4/2006 | Sipila | |
| 2006/0160539 A1 | 7/2006 | Juan et al. | |
| 2008/0220766 A1 | 9/2008 | Bertho et al. | |
| 2008/0220784 A1 * | 9/2008 | Somasundaram et al. | 455/437 |
| 2009/0023436 A1 | 1/2009 | Wu | |
| 2009/0059871 A1 | 3/2009 | Nader et al. | |
| 2009/0323638 A1 | 12/2009 | Catovic et al. | |

FOREIGN PATENT DOCUMENTS

WO    WO 2009/058069    7/2009

OTHER PUBLICATIONS

3GPP TS 25.331 V8.5.0 (Dec. 2008), pp. 1-33, 189-261, 1509-1535.
3GPP TS 25.215 V7.4.0 (Nov. 2007), pp. 1-20.
International Search Report and Written Opinion for International Application No. PCT/SE2010/050184, mailed Jun. 24, 2010.

* cited by examiner

*Primary Examiner* — Hanh Nguyen
(74) *Attorney, Agent, or Firm* — Nixon & Vanderhye P.C.

(57) ABSTRACT

A method, apparatus, and system are described relating to at time when a wireless terminal reports an event to a network. An event to be reported to the network is detected by the wireless terminal. A communications condition affecting a communication between the wireless terminal and the network is determined, and based on the detected communications condition, a dynamic time-to-trigger period is adjusted so that the event is reported by the wireless terminal to the network before the time-to-trigger period expires.

21 Claims, 6 Drawing Sheets

DYNAMIC TIME TO TRIGGER FOR UE MEASUREMENTS

TECHNICAL FIELD

The technology pertains to the field of telecommunications, and particularly, to measurements performed by wireless communications terminals sometimes referred to as user equipments (UEs).

BACKGROUND

A mobile radio communication system, such as a UMTS (Universal Mobile Telecommunication System) type system, includes a mobile radio communication network communicating with mobile terminals or UEs (User Equipments) and with external networks (not specifically shown). The mobile radio communication network includes: a radio access network or UTRAN (UMTS Terrestrial Radio Access Network) and a core network CN.

Third generation systems, in particular of UMTS Universal Mobile Telecommunication System) type, use a radio access technology of W-CDMA (Wideband-Code Division Multiple Access) type. The UTRAN includes base stations (each of which is called a Node B) and base station controllers or radio network controllers (RNC). Each base station provides radio coverage for one or more cell areas. The UTRAN communicates on the one hand with the mobile terminals UE, via an interface called the "Uu" interface (or radio interface), and on the other hand with the CN via an interface called the "Iu" interface. In the UTRAN, the Node B base stations communicate with the base station controllers RNC via an interface called the "Iub" interface, and an interface called the "Iur" interface can further be provided between RNCs.

Certain aspects of radio resource control used in the UTRAN are outlined briefly here. For a more complete description, see for example the 3GPP Technical Specification TS 25.331 defining the RRC (Radio Resource Control) protocol and published by the 3GPP (3rd Generation Partnership Project). For optimized management of the radio resources, the RNC executes certain mobility management functions. Mobility management algorithms have therefore been defined in the UTRAN, based on a system of states called RRC states and transitions between those states.

There are two modes for a UE: idle mode, in which there is no connection between the UE and the UTRAN, and the UTRAN has no information on the location of the LIE, and connected mode, in which there is a connection between the UE and the UTRAN, and the UTRAN holds information on the location of the UE. In the connected mode, various possible states of a UE are distinguished: a state called the Cell_DCH state (where DCH stands for Dedicated Channel), in which the UTRAN knows that the UE is located in one or more cells called active cells, the UE effecting radio measurements and reporting the results of those measurements to the network, a state called the Cell_FACH state (where FACH stands for Forward Access Channel), in which the UTRAN knows that the UE is located in a cell, the UE effecting radio measurements and itself effecting cell reselection on the basis of the results of these measurements and informing the network thereof by means of a cell update procedure, a state called the Cell_PCH state (where PCH stands for Paging Channel), in which the UE can be contacted only by means of a paging procedure, and the location of the terminal is known at the cell level, the UE effecting radio measurements and itself effecting cell reselection on the basis of the results of those measurements and informing the network thereof by means of a cell update procedure, a state called the URA_PCH state (where URA stands for UTRAN Registration Area and PCH stands for Paging Channel), in which the UE can be contacted only via a paging procedure and the location of the terminal is known at the set of cells or URA level, the UE effecting radio measurements and itself effecting cell reselection on the basis of the results of those measurements and informing the network thereof via a URA update procedure.

The radio measurements effected by the UE are controlled by the network (UTRAN). The UTRAN can therefore send various radio measurement control information to the UE, e.g., by broadcasting system information and/or by transmitting a dedicated signaling message called a Measurement Control message.

TS 25.215 relates to physical layer (L1) measurements and outlines a toolbox of measurement abilities for the UE and the UMTS terrestrial radio access network (UTRAN). These measurements can be differentiated in various reported measurement types: intra-frequency measurements (measurements effected on the same frequency as that used by the active cell or cells with which a UE is currently connected), inter-frequency measurements (measurements effected on a frequency different from that used by the active cell or cells), inter-RAT measurements, where RAT stands for "radio access technology" (or measurements effected on cells of another system, for example the GSM (Global System for Mobile communications)), using a radio access technology different from that used for the active cell or cells, traffic volume, quality, and UE internal measurements. The measurements are distinguished between measurements in the UE (the messages will be described in the RRC Protocol or MAC Protocol) and measurements in the UTRAN (the messages will be described in the NBAP and the Frame Protocol).

To initiate a specific UE measurement, the UTRAN transmits a "measurement control message" to the UE including a measurement ID and type, a command (setup, modify, release), the measurement objects and quantity, the reporting quantities, criteria (periodical/event-triggered) and mode (acknowledged/unacknowledged). The results of the measurements are sent back to the UTRAN in measurement report messages either periodically, after some triggering event, or using a combination of the two. When the reporting criteria are fulfilled, the UE answers with a "measurement report message" to the UTRAN including the measurement ID and the results.

Intra-frequency cell measurements are based on measurements on the Received Signal Code Power (RSCP), which is the received power on one code measured on the Primary Common Pilot CHannel (CPICH), and/or on the energy per chip divided by power density in the intra-frequency band Ec/No for the CPICH. Depending on whether these measurements fulfill some condition(s), the UE sends the UTRAN report with the current intra-frequency cell measurements.

A UE may perform soft handover (SHO) to improve reception quality in a peripheral area of a cell. In SHO, the UE communicates with multiple radio base stations (or cells/sectors) with radio links connected therebetween. In general, the radio link between the mobile station and each base station is called a "branch," and a set of the multiple base stations/cells having communications made through the radio links in SHO is called an "active set." In addition, "branch addition" (referred to as reporting event 1A in TS 25.331) indicates an event where a SHO link with a new radio base station cell is added to the mobile's active set, and "branch exclusion" (referred to as reporting event 1B in TS 25.331) indicates an event in which a radio base station cell already communicating with the UE through a radio link is excluded from the active set. Moreover, "branch replacement" (referred to as reporting event 1C in TS 25.331) indicates an event in which the radio base station cell having he poorest radio quality in the active set is replaced with a radio base station cell not included in the active set but having better radio quality when the number of radio base station cells in the active set exceeds a predetermined value. Reporting event 1D in TS 25.331 changes the current best cell in the active set to a new best cell.

A UE monitors radio quality (for example, CPICH RSCP, CPICH Ec/N0 and pathloss) between the UE and each of the radio base station cells, makes a determination on branch addition, branch exclusion, branch replacement, and best cell change by using the radio quality, and then reports the determination result to a radio control station. Then, the radio control station makes a control for SHO according to the content reported from the UE The Time-To-Trigger (TTT) is normally a parameter broadcasted by the network in the System Information Block (SIB). UEs follow the measurement and reporting processes described above. After a measured condition is fulfilled and after TTT has expired, a measurement report is sent to the network. The measurement report is processed by the network, and the network may respond based on the report by sending a command to the UE, e.g., a cell change command. During network processing time, the current source cell signal quality may drop rapidly so that UE is not able to receive data from the network. As a result, the UE would not receive the network commands such as the cell change command. Unfortunately, this may well result in the ongoing call being dropped, which is highly undesirable.

SUMMARY

A method, apparatus, and system are described relating to a time when a wireless terminal reports an event to a network. An event to be reported to the network is detected by the wireless terminal. A communications condition affecting a communication between the wireless terminal and the network is determined, and based on the detected communications condition, a dynamic time-to-trigger period is adjusted so that the event is reported by the wireless terminal to the network before the time-to-trigger period expires.

The communications condition may be one or more of a variety of conditions such as a time sensitive report or request from the wireless terminal, a handover of a communication involving the wireless terminal, or a low quality radio channel being used by the wireless terminal to communicate with the network.

A time may be estimated when the active connection may be dropped or lost because of the detected communication condition. The time-to-trigger period is reduced so that a channel reconfiguration message from the wireless terminal arrives at the network before the active connection is lost or dropped.

In one non-limiting example embodiment, a rate of change of a received signal parameter is determined for a signal received from base station currently serving the wireless terminal. The communications condition is then based on the determined rate of change. A time may then be estimated when the active connection may be dropped or lost because of the determined rate of change. The predetermined time period is preferably reduced so that a radio channel reconfiguration message from the wireless terminal arrives at the network before the active connection is lost or dropped.

A round trip transmission time (RTT) associated with transmitting the event report to the network and receiving from the network the radio channel reconfiguration message is determined. A network processing delay associated with receiving the channel reconfiguration message and generating the channel reconfiguration message is also determined. The time-to-trigger period is reduced so that a total time associated with the reduced time-to-trigger period together with the round trip transmission time and the network processing delay is less than the estimated time when the active connection may be dropped or lost.

A network is provided for use with one or more wireless terminals as described above. A network node can provide an initial time to trigger value, the network processing delay, the RTT, or the adjustment to the time-to-trigger to the wireless terminal.

DETAILED DESCRIPTION

In the following description, for purposes of explanation and not limitation, specific details are set forth such as particular architectures, interfaces, techniques, etc. However, it will be apparent to those skilled in the art that the claimed technology may be practiced in other embodiments that depart from these specific details. That is, those skilled in the art will be able to devise various arrangements which, although not explicitly described or shown herein, embody the principles of the claimed technology and are included within its spirit and scope. In some instances, detailed descriptions of well-known devices, circuits, and methods are omitted so as not to obscure the description with unnecessary detail. All statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein represent conceptual views of illustrative circuitry embodying the principles of the technology. Similarly, it will be appreciated various processes described may be substantially represented in a computer-readable medium and can be executed by a computer or processor.

The functions of the various elements including functional blocks labeled or described as "processor" or "controller" or "computer" may be provided through the use of dedicated hardware as well as hardware capable of executing software. When provided by a processor, the functions may be provided by a single dedicated processor, by a single shared processor, or by a plurality of individual processors, some of which may be shared or distributed. Moreover, a "processor" or "controller" may include, without limitation, digital signal processor (DSP) hardware, ASIC hardware, read only memory (ROM), random access memory (RAM), and/or other storage media.

Figure 1:
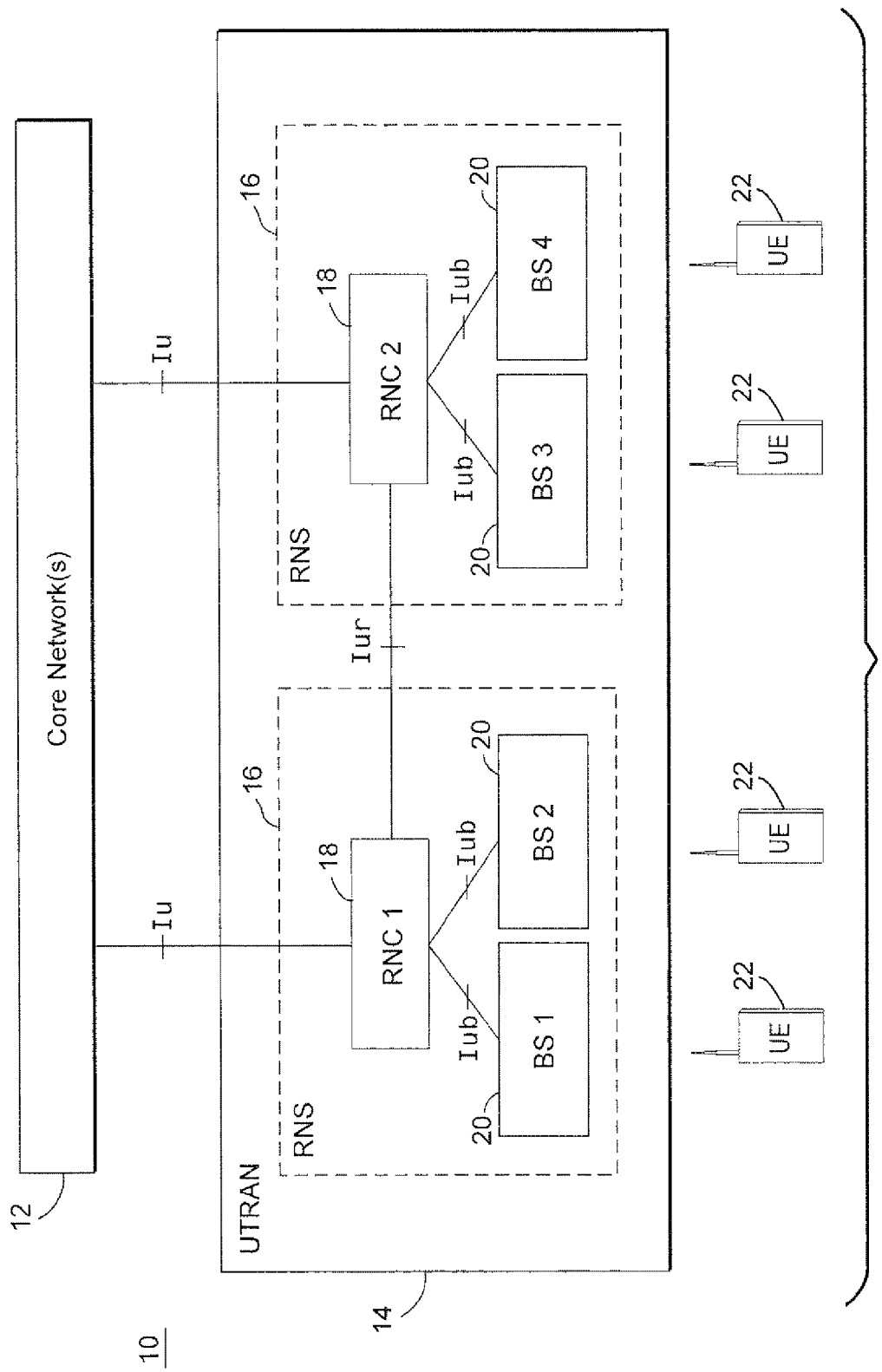
FIG. 1 a block diagram of a non-limiting example embodiment of a third generation WCDMA type radio communications system.

FIG. 1 illustrates a non-limiting example of a third generation, WCDMA-based cellular radio communication system 10. The User Equipment (UE) 22 is the mobile radio terminal by which a user/subscriber can access services offered by the operator's Core Network(s) 12. Those networks are coupled to other networks such as the public switched telephone network (PSTN) and the Internet (not shown). The UMTS Terrestrial Radio Access Network (UTRAN) 14 is responsible for the establishment and control of radio connections with the mobile UEs. The Radio Network Subsystem (RNS) 16 controls a number of Base Stations (BSs) 20 in the UTRAN 14. Each base station 20 coordinates radio communications in one or more cells. A cell covers a geographical area and is identified by a unique identity broadcast in the cell by its base station. There may be more than one cell covering the same geographical area, and in this case, two of the base station cells may be co-sited. Each Radio Network Controller (RNC) 18 controls radio resources and radio connectivity within a set of cells.

FIG. 1 shows interfaces connecting the different nodes in the UTRAN 14. The Iu interface is defined between the core network 12 and the UTRAN 14. The Iur interface is defined for communications between RNCs 18. The Iub interface is defined for communications between the RNC 18 and its base stations 20. User data is transported on transport bearers over these interfaces. Depending on the transport network used, these transport bearers may be mapped to AAL2 connections (in case of an ATM-based transport network) or UDP connections (in case of an IP-based transport network).

Figure 2:
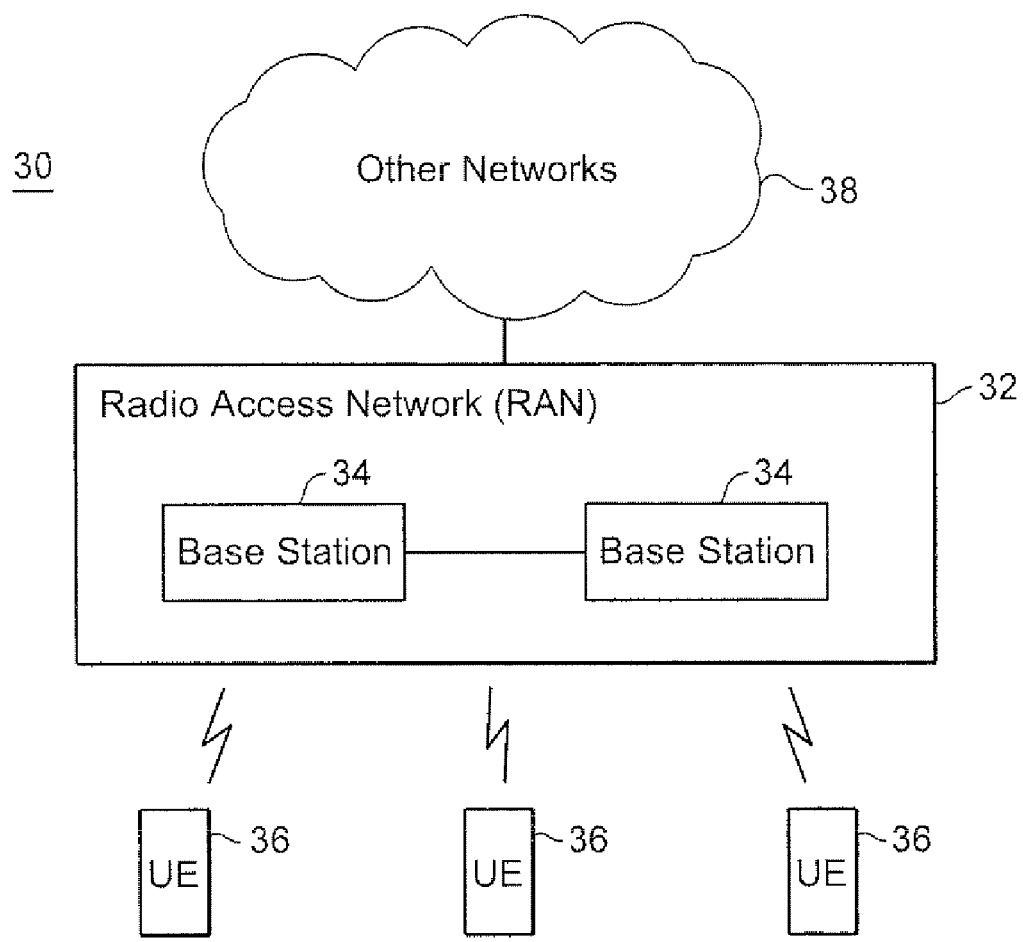
FIG. 2 a block diagram of a non-limiting example embodiment of fourth generation LTE type radio communications system.

FIG. 2 illustrates an LTE mobile communication system 30. A radio access network (RAN) 32 is coupled to one or more other networks 38 such as one or more core network nodes and one or more external networks such as the public switched telephone network (PSTN) and the Internet. The RAN 32 includes base stations 34 that communicate with each other, e.g., for handover and other coordinated functions. The base stations communicate over the radio/air interface with mobile radio terminals also referred to as user equipment (UE) 36. At least some of the operations that would be performed in the RNC in the UMTS system 10 shown in FIG. 1 are performed in the base stations in the LTE system 30.

This description focuses on a WCDMA radio communication system according to the 3GPP UTRAN standards like that shown in FIG. 1) but the technology in general covers other wireless communication systems that where UE measurement reports are sent after a time-to-trigger (TTT) period is satisfied. For example, the technology might be employed with the LTE type system in FIG. 2.

A time-to-trigger (TTT) condition is typically used to limit the number of event-triggered UE measurement reports to the network, and ultimately, the signaling load. A time-to-trigger condition may be associated with an event such that the report is triggered only after the condition(s) satisfying the event exist(s) for the specified time-to-trigger. The effect of the time-to-trigger is that the event where a radio broadcast channel satisfies a particular condition is not reported until the radio broadcast channel has been in that range for the time-to-trigger interval. Non-limiting example reporting events are now described.

Reporting event 1A is detected by a UE when a measurement parameter (e.g., power) of a primary CPICH for a base station cell enters the reporting range. This happens when a CPICH Ec/No and/or RSCP from a new cell satisfies Equation 1 or Equation 2 for a certain period of time specified by a Time to Trigger (TTT). The TTT is a parameter broadcast by the UTRAN. If some other conditions are satisfied, the reporting event 1A will be sent by the UE to the network.

Triggering condition for pathloss: Equation 1

$$10 \cdot \mathrm{Log} M_{NEW} + CIO_{New} \leq W \cdot 10 \cdot \mathrm{Log}\left(\frac{1}{\sum_{i=1}^{N_A}\left(\frac{1}{M_i}\right)}\right) +$$
$$(1-W) \cdot 10 \cdot \mathrm{Log} M_{Best} + \left(\frac{R_{1a} - H_{1a}}{2}\right),$$

Triggering condition for all the other measurement quantities: Equation 2

$$10 \cdot \mathrm{Log} M_{NEW} + CIO_{New} \geq$$
$$W \cdot 10 \cdot \mathrm{Log}\left(\sum_{i=1}^{N_A} M_i\right) + (1-W) \cdot 10 \cdot \mathrm{Log} M_{Best} - \left(\frac{R_{1a} - H_{1a}}{2}\right),$$

The variables in the Equation 1 and Equation 2 are defined as follows. $M_{New}$ is the measurement result of the cell entering the reporting range. $CIO_{New}$ is the individual cell offset for the cell entering the reporting range if an individual cell offset is stored for that cell. Otherwise it is equal to 0. $M_i$ is a measurement result of a cell not forbidden to affect reporting range in the active set. $N_A$ is the number of cells not forbidden to affect reporting range in the current active set. For pathloss, $M_{Best}$ is the measurement result of the cell not forbidden to affect reporting range in the active set with the lowest measurement result, not taking into account any cell individual offset. For other measurements quantities, $M_{Best}$ is the measurement result of the cell not forbidden to affect reporting range in the active set with the highest measurement result, not taking into account any cell individual offset. W is a parameter sent from UTRAN to UE. $R_{1a}$ is the reporting range constant. $H_{1a}$ is the hysteresis parameter for the event 1a. If the measurement results are pathloss or CPICH Ec/No then $M_{New}$, $M_i$ and $M_{Best}$ are expressed as ratios. If the measurement result is CPICH-C-RSCP then $M_{New}$, $M_i$ and $M_{Best}$ are expressed in mW.

Another reporting event is event 1C which indicates that a non-active cell's primary CPICH becomes better than an active cell's primary CPICH. This event is triggered when CPICH Ec/No and/or RSCP fulfills Equation 3 or Equation 4 for a certain period of time specified by TTT.

Equation 3—Triggering Condition for Pathloss.

$$10 \cdot \mathrm{Log} \ M_{New} + CIO_{New} \leq 10 \cdot \mathrm{Log} \ M_{InAS} + CIO_{InAS} - H_{1c}/2,$$

Equation 4—Triggering Condition for All the Other Measurement Quantities.

$$10 \cdot \mathrm{Log} \ M_{New} + CIO_{New} \geq 10 \cdot \mathrm{Log} \ M_{InAS} + CIO_{InAS} + H_{1c}/2,$$

The variables in the Equation 3 and Equation 4 are defined as follows. $M_{New}$ is the measurement result of the cell not included in the active set. $CIO_{New}$ is the individual cell offset for the cell becoming better than the cell in the active set if an individual cell offset is stored for that cell. Otherwise, it is equal to 0. For pathloss, $M_{InAS}$ is the measurement result of the cell in the active set with the highest measurement result. For other measurement quantities, $M_{InAS}$ is the measurement result of the cell in the active set with the lowest measurement result. $CIO_{InAS}$ is the individual cell offset for the cell in the active set that is becoming worse than the new cell. $H_{1c}$ is the hysteresis parameter for the event 1c. If the measurement results are pathloss or CPICH-Ec/No then $M_{New}$ and $M_{InAS}$ are expressed as ratios. If the measurement result is CPICH-RSCP then $M_{New}$ and $M_{InAS}$ are expressed in mW.

Yet, another reporting event is event 1D which indicates that another cell is better than the current best cell, the best cell should be changed to the other cell. Similar to the previous events, when a CPICH Ec/No and/or RSCP satisfies Equation 5 or Equation 6 for a certain period of time specified by TTT, the reporting event 1D is triggered.

Equation 5—Triggering Condition for Pathloss:

$$10 \cdot \log M_{NotBest} + CIO_{NotBest} \leq 10 \cdot \log M_{Best} + CIO_{Best} - H_{1d}/2,$$

Equation 6—Triggering Condition for All the Other Measurement Quantities:

$$10 \cdot \log M_{NotBest} + CIO_{NotBest} \geq 10 \cdot \log M_{Best} + CIO_{Best} + H_{1d}/2,$$

The variables in the Equation 5 and Equation 6 are as defined as follows. $M_{NotBest}$ is the measurement result of a cell not stored in "best cell" in the variable BEST_CELL_1D_EVENT. $CIO_{NotBest}$ is the cell individual offset of a cell not stored in "best cell" in the variable BEST_CELL_1D_EVENT. $M_{Best}$ is the measurement result of the cell stored in "best cell" in variable BEST_CELL_1D_EVENT. $CIO_{Best}$ is the cell individual offset of a cell stored in "best cell" in the variable BEST_CELL_1D_EVENT. $H_{1d}$ is the hysteresis parameter for the event 1d. If the measurement results are pathloss or CPICH-Ec/No then $M_{Not\ Best}$ and $M_{Best}$ are expressed as ratios. If the measurement result is CPICH-RSCP then $M_{Not\ Best}$ and $M_{Best}$ are expressed in mW.

Most TTT periods are preset and fixed, which as explained in the background, presents a problem. The signalling diagram in FIG. 3 helps in the explanation of that problem. The UE is measuring one or more conditions. When a measured condition exceeds a predetermined threshold, a TTT timer is started at step 1. After the TTT timer expires in step 2, an RRC measurement report is sent to the network at step 3, which is processing by the network at step 4. The network may send a command to the UE to perform a cell change command, e.g., an RRC physical channel reconfiguration command. The time it takes to receive the sent measurement report coupled with the time it takes to receive the sent cell change command is the round trip time (RTT). During the RTT and the network processing time, the source base station cell signal quality may drop very rapidly with the result that the UE is no longer able to receive any data from the network. For example, as UEs move from one cell to another, the signal quality from the current serving cell may deteriorate so fast that the UE may not receive the network command to change cell. As a result, there is not enough time to make the cell change, and the call will drop.

Figure 3:
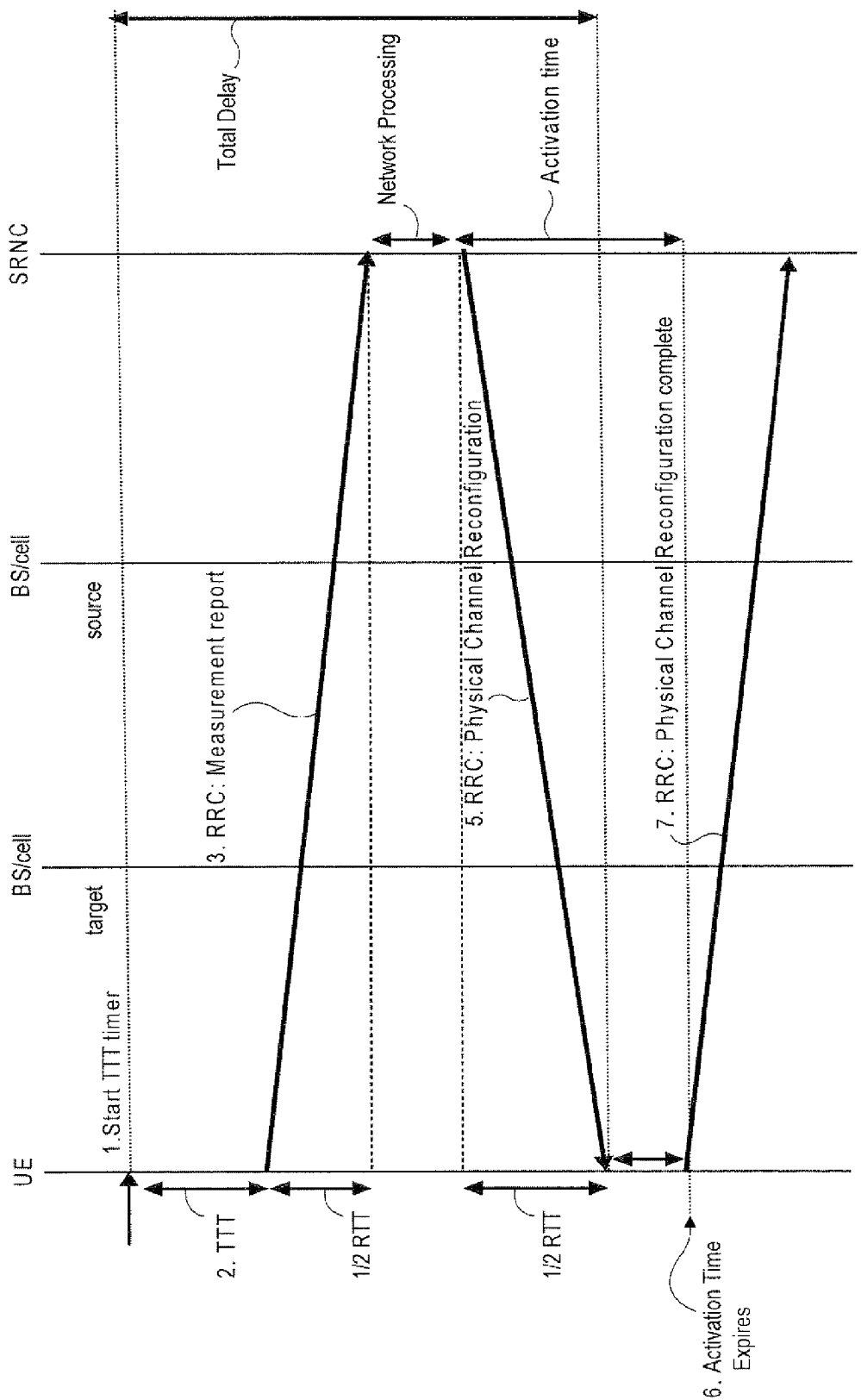
FIG. 3 is an example signaling diagram showing procedures associated with UE measurement and reporting.

The technology in this application overcomes this problem using a dynamic TTT that is adjusted based on current conditions. This dynamic TTT may be applied to any event, but is particularly useful for critical events such as, for instance, a 1D event which may lead to a call drop or imply a physical channel reconfiguration. FIG. 3 shows different delays from the time the UE detected a better cell (step 1) until it actually receives the physical channel reconfiguration command. Both network preparation time at step 4 and activation time from change cell command to cell change completed (steps 5-7) cannot be easily modified. However, the inventors realized that the Time to Trigger value could be readily changed to reduce the overall "delay budget." A dynamic TTT—as opposed to a fixed or static TTT—allows the UE to send reports more reliably based on one or more current conditions. This is particularly important for but not limited to critical reporting events such as, for instance, a 1D event. Adjusting the TTT means that dropping of calls may be reduced or avoided thereby increasing user satisfaction. The network resources are also used more efficiently, the drop rate for fast moving UEs is reduced, and UE battery power is saved because the UE is in the best cell and only moves to another cell when a change in radio conditions requires.

Figure 4:
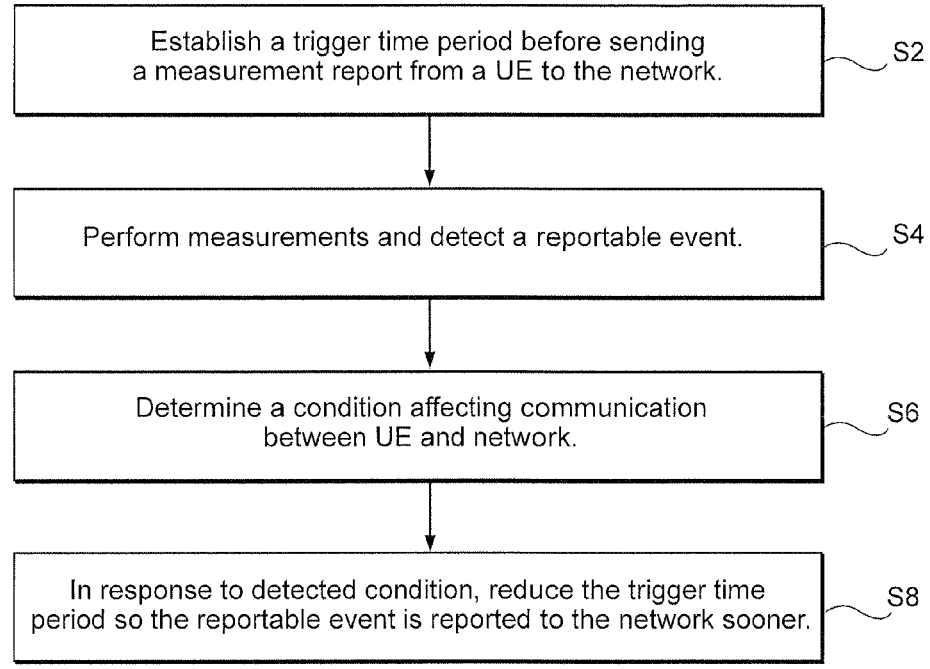
FIG. 4 is a flow chart showing non-limiting example procedures for use in a wireless terminal related to UE measurement and reporting.

FIG. 4 is a flow chart showing non-limiting example procedures for use in a wireless terminal related to UE measurement and reporting. An initial Time-to-Trigger (TTT) value is established before a UE sends a measurement report to the network (step S2). The network might establish this value and send it to the UE or it may be prestored in the UE. The UE performs various measurements, e.g., on received broadcast signals from nearby cells, and detects when a reportable event occurs, e.g., a received signal power exceeds or falls below a threshold value (step S4). The UE also determines a condition that affects the radio communication between the UE and the network (step S6). In the non-limiting example described below, the condition is a rapidly deteriorating received signal power from a particular base station such as the current serving base station. In response to that condition, the Time-to-Trigger (TTT) value is reduced so that the reportable event is reported to the network sooner, e.g., before the call connection is dropped.

Figure 5:
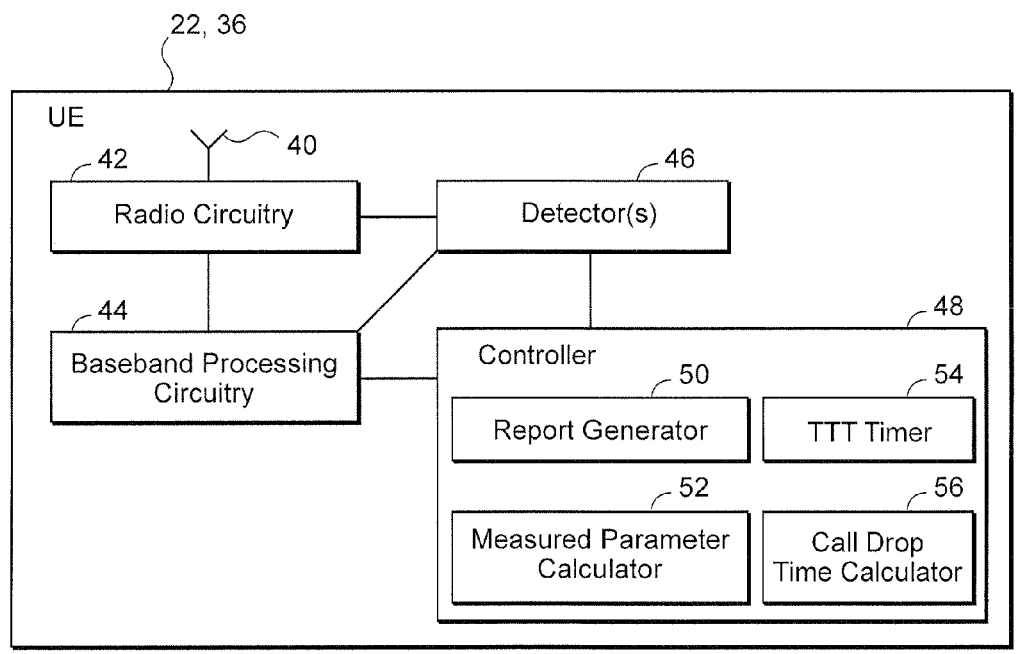
FIG. 5 is a non-limiting, example function block diagram illustrating a portion of a wireless terminal.

FIG. 5 is a non-limiting, example function block diagram illustrating a portion of a UE 22, 26. Radio signals are transmitted and received via one or more antennas 40 and processed by radio circuitry 42, e.g., filtering, amplification, conversion between baseband and RF, etc. The radio circuitry 42 is coupled to baseband processing circuitry 44, which performs baseband processing, e.g., error coding, interleaving, spreading, modulation, demodulation, despreading, de-interleaving, error detection/correction, etc., and to one or more received signal parameter detectors 46, which detect signal parameters like received signal strength, e.g., RSCP, signal to noise ratio, e.g., Ec/No, a channel quality indicator (CQI), etc. In a non-limiting example embodiment, the UE may make more frequent measurements once it has detected a better serving cell. A controller 48, coupled to both the detector(s) 46 and the baseband processing circuitry 44, includes a report generator 50, a report parameter calculator 52, a TTT timer 54, and a call drop time calculator 56. The call drop time calculator 56 calculates an estimated call drop time based on one or more measured parameters calculated by 52 using one or more conditions measured by the detector(s) 46. The report parameter calculator 52 determines from the one or more measured parameters when a reportable event occurs and provides that information to the report generator 50. If the call drop time calculator 56 detects a condition that requires an adjustment of the TTT timer value, e.g., a reduction thereof, it makes that adjustment to the TTT timer 54. The report generator 50 monitors the TTT timer 54, and sends the report to the network if the reportable event still exists when the TTT timer 54 expires.

Consider the following non-limiting example of the radio condition calculation that may be performed by the call drop time calculator 56. The rate of change of detected RSCP or Ec/No from the serving base station may be calculated using Equations 7 and 8 below. The rate of change of RSCP:

$$v_{RSCP} = \frac{dRSCP}{dt} \quad (7)$$

The rate of change of Ec/No:

$$v_{Ec/No} = \frac{dEcNo}{dt} \quad (8)$$

If RSCP values are used, the call drop time may be calculated as:

$$t_{call\_drop} = \frac{RSCP_{min} - RSCP_{now}}{v_{RSCP}} \quad (9)$$

A similar formula can be used if Ec/No values are used:

$$t_{call\_drop} = \frac{EcNo_{min} - EcNo_{now}}{v_{RSCP}} \quad (10)$$

A similar equation may be used for channel quality indicator (CQI) values.

The total delay budget referring to FIG. 3 is:

Delay=*TTT*+Network_processing_delay+*RTT*

UEs can estimate the RTT as well as the network processing delay. For example, when a UE adds a new cell to its active set, some estimate of RTT may be obtained. That is, when the UE sends a message to which the UE expects a response from the network, the UE knows the time when it sent the message and when it received the network response. From this information, the UE can estimate the RTT as well as the network processing delay. The UE then adjusts the TTT value in the TTT timer so that:

Drop_time≧*TTT*+Network_processing_delay+*RTT* (11)

Using equation (11), the UE estimates the time when the call may drop and adjusts the TTT so that the physical channel reconfiguration message arrives at the UE before the signal is too weak. This estimation for example may be assessed using Ec/No—RSCP values and a minimum Ec/No—RSCP value which may be the UE detection threshold with some safety margin. The UE adjusts the TTT so that the whole budget delay is less than the estimated drop time.

Figure 6:
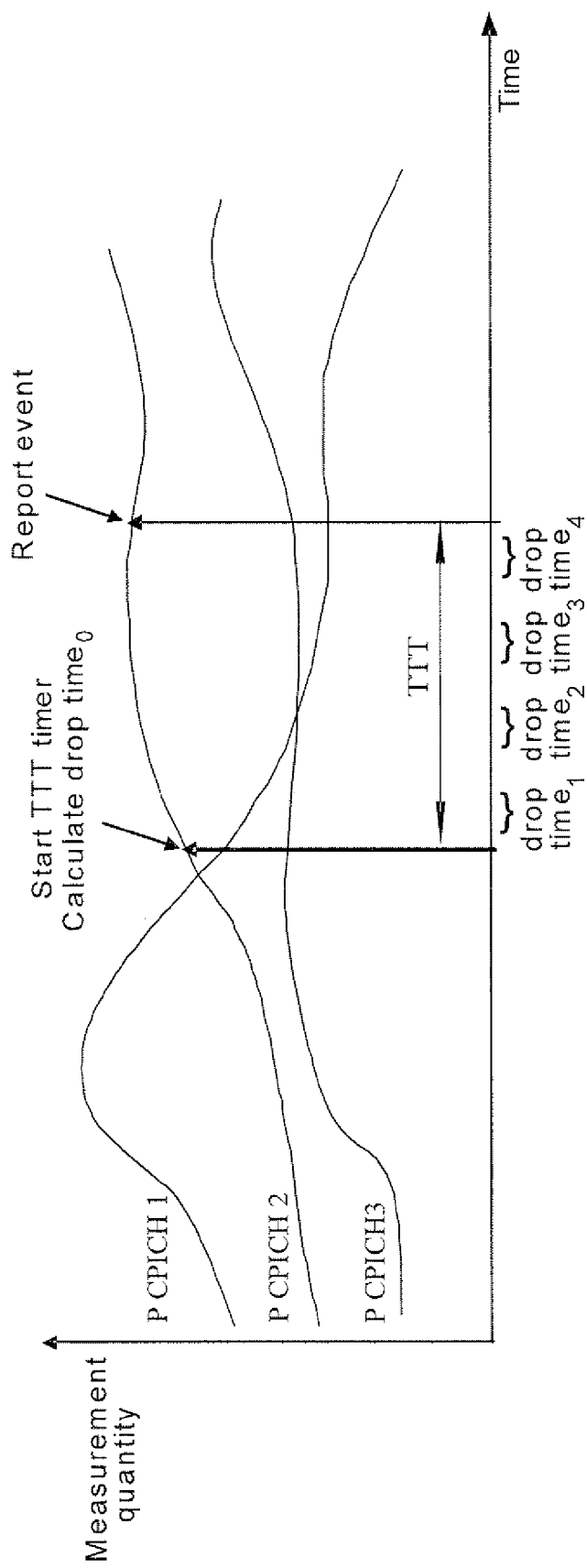
FIG. 6 is a graph illustrating several measured parameter values against time for three cell broadcast channels.

FIG. 6 is a graph illustrating a UE's received power measurements P for three cell pilot channels CPICH 1-3 where initially CPICH 1 is the current best channel. At time t0 a reportable event occurs when the power from CPICH 2 exceeds a threshold value. The UE starts the TTT timer using an initial TTT timer value, e.g., one sent from the network. That value is shown in the figure, and when that value expires, the event is reported. Unfortunately, the received power from CPICH 1 is rapidly decreasing at the same time that CPICH 2 is increasing. If the UE waits for the initial TTT time value to expire the received power will have decreased in a relatively short time from the highest received power of the three pilot channels to the lowest received power. Even if the call being served by cell 1, associated with the CPICH 1, is not dropped, the signal quality, error rate, bandwidth capability, etc. may have deteriorated to the point where the required service is not be provided. Accordingly, a drop time is calculated for the UE in accordance with equation (9) or (10) and then compared in accordance with equation (11). If the drop time exceeds or equals the sum on the right side of equation (11), then no adjustment of the TTT value is needed. But if the drop time is less than the sum, then the TTT value should be reduced. That reduction may be carried out in a number of ways including one or two relatively large reductions or incrementally. The incremental reduction approach is illustrated in FIG. 6. The incremental approach may be preferred for situations where the current serving cell quality can change rapidly which may mean a faster drop time.

Figure 7:
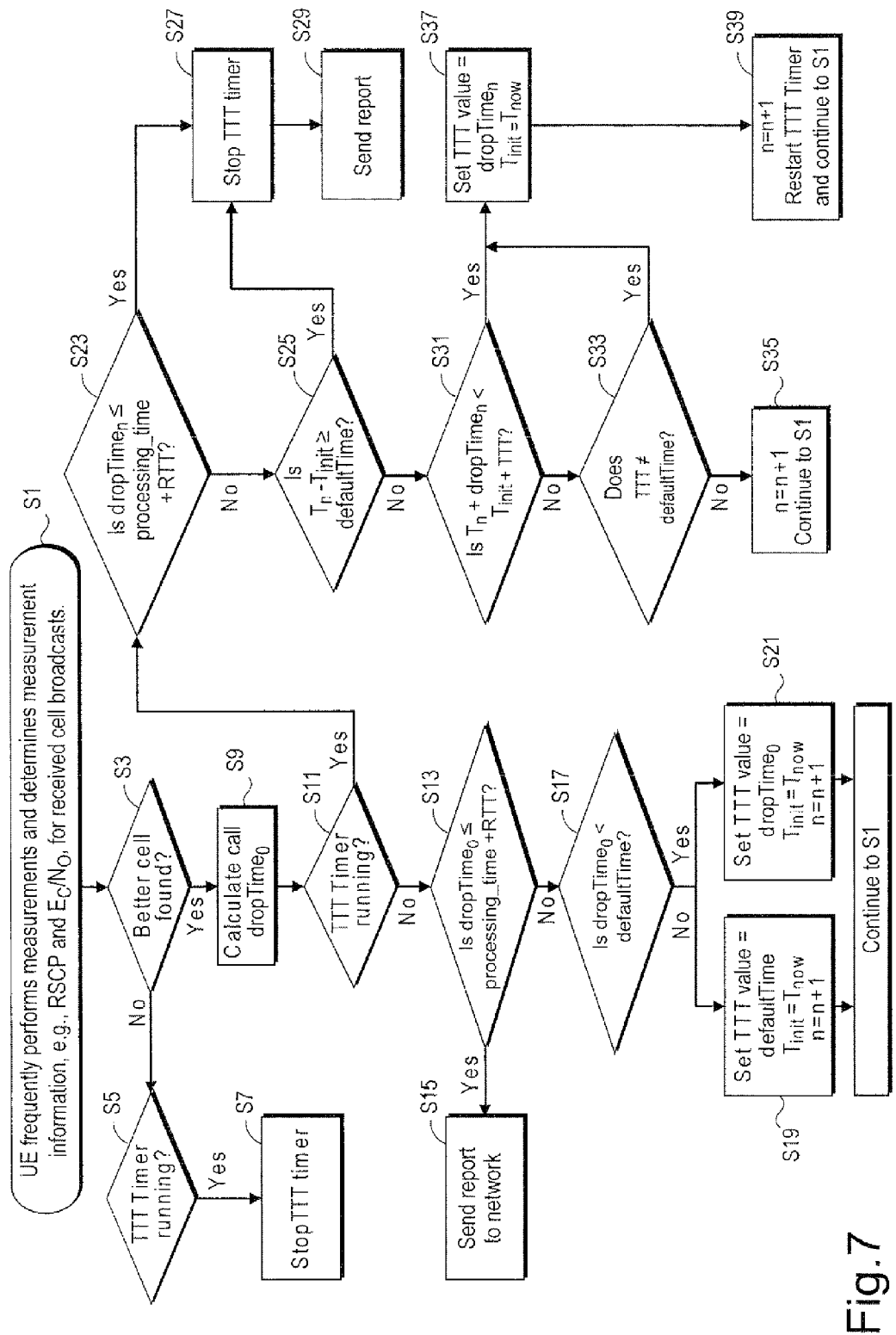
FIG. 7 is a flow chart showing a more detailed, non-limiting set of example procedures for use in a wireless terminal related to UE measurement and reporting.

FIG. 7 is a flowchart showing a more detailed non-limiting set of example procedures for use in a wireless terminal or UE related to UE measurement and reporting of a 1D type event where the UE discovers there is a better cell than the current cell currently serving the UE. The UE frequently performs measurements and determines measurement information, e.g., RSCP and/or $E_c/N_0$, for received cell broadcast signals, such as the CPICH from each cell (step S1). A decision is made in step S3 whether the UE-detected measurement information from another cell indicates that it is a better cell than the current serving cell (step S3). If not, a TTT timer is checked to see if it is running (step S5). If it is, the TTT timer is stopped (step S7).

If a better cell is found in step S3, the UE calculates a call dropTime$_0$ (step S9). A decision is made whether the TTT timer is running (step S11). If not, a decision in step S13 determines whether the dropTime$_0$ is less than or equal to the network processing time plus the round trip time (RTT). If it is, the UE immediately sends the "better cell found" report to the network (step S15). If not, the UE determines whether the dropTime$_0$ is less than a defaultTime (step S17). The default-Time is the initial TTT time value broadcast by the network that defines the upper time limit before the report may be sent. If the dropTime$_0$ is less than the default time, then the TTT value is adjusted so that it equals the dropTime$_0$. If the drop-Time$_0$ is not less than the default TTT time value, then the TTT value is set equal to the initial TTT or default TTT value referred to in step S19 as defaultTime. The time $T_{init}$ is the time when the TTT timer is started and is set equal to the current time $T_{now}$, and the index for the current time n is set equal to n+1. $T_{init}$ is updated every time the algorithm is run. The updated value $T_{init}$ is the time at which the algorithm is running—$T_{now}$. Control then returns to step S1. If the drop-time$_0$ is less than the default time, the TTT value is set equal to the drop time$_0$ in step S21. $T_{INIT}$ is set equal to $T_{NOW}$, and the index n is set equal to the next time interval n+1. Control returns to step S1.

Assuming that the better cell condition continues to exist, the call dropTime$_0$ is recalculated in step S9, and the decision in block S11 indicates that the TTT timer is running because that timer was started in block S19 or block S21.

A decision is made in step S23 whether the recently-calculated dropTime$_n$ is less than or equal to the network processing time plus the round trip time (RTT), i.e., before the UE receives any message from the network. If that is true, the WE sends the message straight away by stopping the TTT timer (step S27) and sending the report to the network (step S29). In other words, the current drop time is determined to be less than the forecasted delay time for processing a channel reconfiguration message and getting that command to the UE, so the report must be sent immediately.

A decision is made in step S25 whether difference between the current time $T_n$ and $T_{init}$ (the time when timer TTT is started) is greater than or equal to the upper limit default value for TTT referred to as defaultTime broadcasted by the network. Step S25 ensures that the defaultTime is the latest time when the report is sent. If that difference is greater than or equal to the initially default TTT value, then the TTT timer is stopped (step S27), and the report is sent to the network (step S29).

If that difference is greater than or equal to the initially default TTT value, then a determination is made in step S31 whether the current time $T_n$ plus the current estimated dropTime$_n$ is less than the initial time $T_{init}$ (when the TTT started) plus the current value in the TTT timer. If this is true, the radio conditions have changed and the time to drop is less than the previously calculated value. Therefore, values are updated: The TTT timer is set to the dropTime$_n$ that the UE just calculated and $T_{init}$ is updated to $T_{now}$ (step S37). Thereafter, the time index n is set to n+1, the TTT timer is restarted, and control returns to step S1 (S39). If S31 is not true, then radio conditions are either same as before or have improved, and control continues in that case to step S33 which checks if the TTT timer is not equal to the defaultTime. If so, the TTT value is set equal to the dropTime$_n$, and $T_{init}$ is set equal to $T_{now}$ (step S37) and control continues to step S39. If not, the time index n is incremented, and control returns to step S1 (S35)

Although various embodiments have been shown and described in detail, the claims are not limited to any particular embodiment or example. None of the above description should be read as implying that any particular element, step, range, or function is essential such that it must be included in the scope of the claims. The scope of patented subject matter is defined only by the claims. The extent of legal protection is defined by the words recited in the allowed claims and their equivalents. Reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved, for it to be encompassed by the present claims. It is not necessary for a device or method to address each and every problem sought to be solved by the present technology, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

What is claimed is:

1. A method relating to a time when a wireless terminal reports an event to a network, the method implemented in the wireless terminal comprising:
   the wireless terminal detecting an event to be reported to the network;
   the wireless terminal determining a communications condition affecting a communication between the wireless terminal and the network, wherein the communication being affected by the communications condition is the communication of reporting the detected event to the network; and
   based on the communications condition, the wireless terminal adjusting a time-to-trigger period so that the event is reported by the wireless terminal to the network before the time-to-trigger period expires,
   the method further comprising;
   determining a rate of change of a received signal parameter for a signal received from a base station currently serving the wireless terminal,
   wherein the communications condition is a based on the determined rate of change.

2. The method of claim 1, wherein the time to trigger period is provided to the wireless terminal from the network.

3. The method of claim 1, wherein the communications condition is a time sensitive report or request from the wireless terminal.

4. The method of claim 1, wherein the communications condition is a handover of a communication involving the wireless terminal.

5. The method of claim 4, further comprising:
   estimating a time when the active connection may be dropped or lost because of the detected communication condition;
   wherein the time-to-trigger period is reduced so that a channel reconfiguration message from the wireless terminal arrives at the network before the active connection is lost or dropped.

6. The method of claim 1, wherein the wireless terminal is engaged in an active connection with the network over a radio channel and the communications condition is a low quality radio channel.

7. The method of claim 1, further comprising:
   estimating a time when the active connection may be dropped or lost because of the determined rate of change;
   wherein the predetermined time period is reduced so that a radio channel reconfiguration message from the wireless terminal arrives at the network before the active connection is lost or dropped.

8. The method of claim 7, further comprising:
   determining a round trip transmission time (RTT) associated with transmitting the event report to the network and receiving from the network the radio channel reconfiguration message;
   determining a network processing delay associated with receiving the channel reconfiguration message and generating the channel reconfiguration message;
   wherein the time-to-trigger period is reduced so that a total time associated with the reduced time-to-trigger period together with the round trip transmission time and the network processing delay is less than the estimated time when the active connection may be dropped or lost.

9. The method of claim 8, wherein the RTT is determined by the wireless terminal.

10. The method of claim 9, wherein the network processing delay or the RTT is received from the network.

11. The method of claim 1, wherein the adjustment to the time-to-trigger is received from the network.

12. Wireless terminal apparatus implementable in a wireless terminal that reports an event to a network, the wireless terminal apparatus comprising:
   a detector arranged to detect an event to be reported to the network;
   a controller arranged to:
      determine a communications condition affecting a communication between the wireless terminal and the network, wherein the communication being affected by the communications condition is the communication of reporting a detected event to the network; and
      adjust a time-to-trigger period so that the event is reported by the wireless terminal to the network before the time-to-trigger period expires based on the detected communications condition, wherein the controller is further arranged to:
determine a rate of change of a received signal parameter for a signal received from a base station currently serving the wireless terminal, and
determine the communications condition based on the determined rate of change.

13. The wireless terminal apparatus of claim 12, wherein the time to trigger period is provided to the wireless terminal from the network.

14. The wireless terminal apparatus of claim 12, wherein the communications condition is a time sensitive report or request from the wireless terminal.

15. The wireless terminal apparatus of claim 12, wherein the communications condition is a handover of a communication involving the wireless terminal.

16. The wireless terminal apparatus of claim 15, the controller further arranged to:
estimate a time when the active connection may be dropped or lost because of the detected communication condition;
reduce the time-to-trigger period so that a channel reconfiguration message from the wireless terminal arrives at the network before the active connection is lost or dropped.

17. The wireless terminal apparatus of claim 12, wherein the communications condition is a low quality radio channel for a radio channel carrying communications between the wireless terminal and the network.

18. The wireless terminal apparatus of claim 12, wherein the controller is arranged to:
estimate a time when the active connection may be dropped or lost because of the determined rate of change;
reduce the time-to-trigger period so that a radio channel reconfiguration message from the wireless terminal arrives at the network before the active connection is lost or dropped.

19. The wireless terminal apparatus of claim 18, wherein the controller is arranged to:
determine a round trip transmission time (RTT) associated with transmitting the event report to the network and receiving from the network the radio channel reconfiguration message;
determine a network processing delay associated with receiving the channel reconfiguration message and generating the channel reconfiguration message;
reduce the time-to-trigger period so that a total time associated with the reduced time-to-trigger period together with the round trip transmission time and the network processing delay is less than the estimated time when the active connection may be dropped or lost.

20. A wireless terminal including the wireless terminal apparatus claimed in claim 12.

21. A network comprising a wireless terminal claimed in claim 20 and a network node arranged to provide a network processing delay, a round trip transmission time (RTT), or the adjustment to the time-to-trigger period to the wireless terminal.

* * * * *

UNITED STATES PATENT AND TRADEMARK OFFICE
CERTIFICATE OF CORRECTION

PATENT NO. : 8,305,997 B2  
APPLICATION NO. : 12/401191  
DATED : November 6, 2012  
INVENTOR(S) : Virkki et al.

Page 1 of 2

It is certified that error appears in the above-identified patent and that said Letters Patent is hereby corrected as shown below:

On the Title Page, in Item (57), under "ABSTRACT", in Column 2, Line 1, delete "to at" and insert -- to a --, therefor.

In the Specifications

In Column 1, Line 20, delete "CN." and insert -- (CN). --, therefor.

In Column 1, Line 21, delete "Universal" and insert -- (Universal --, therefor.

In Column 1, Line 26, delete "(RNC)." and insert -- (RNCs). --, therefor.

In Column 1, Line 47, delete "LIE," and insert -- UE, --, therefor.

In Column 3, Line 4, delete "he" and insert -- the --, therefor.

In Column 4, Line 21, delete "1 a" and insert -- 1 is a --, therefor.

In Column 4, Line 24, delete "2 a" and insert -- 2 is a --, therefor.

In Column 5, Line 56, delete "1)" and insert -- 1, --, therefor.

In Column 6, Line 50, delete "CPICH-C-RSCP" and insert -- CPICH-RSCP --, therefor.

In Column 7, Line 10, delete "$M_{inAS}$" and insert -- $M_{InAS}$ --, therefor.

In Column 7, Line 12, delete "$M_{inAS}$" and insert -- $M_{InAS}$ --, therefor.

Signed and Sealed this  
Fifteenth Day of April, 2014

Michelle K. Lee  
*Deputy Director of the United States Patent and Trademark Office*

CERTIFICATE OF CORRECTION (continued)
U.S. Pat. No. 8,305,997 B2

In Column 7, Lines 30-31, delete "BEST_CELL 1D_EVENT" and insert
-- BEST_CELL_1D_EVENT --, therefor at each occurrence throughout the specification.

In Column 8, Line 37, delete "26." and insert -- 36. --, therefor.

In Column 9, Line 56, delete "to" and insert -- $t_0$ --, therefor.

In Column 10, Line 21, delete "$E_c/N_0$," and insert -- Ec/No, --, therefor.

In Column 10, Lines 47-48, delete "droptime$_0$" and insert -- dropTime$_0$ --, therefor.

In Column 10, Line 49, delete "drop time$_0$" and insert -- dropTime$_0$ --, therefor.

In Column 10, Line 49, delete "$T_{INIT}$" and insert -- $T_{init}$ --, therefor.

In Column 10, Line 49, delete "$T_{NOW}$," and insert -- $T_{now}$, --, therefor.

In Column 10, Line 60, delete "WE" and insert -- UE --, therefor.

In Column 11, Line 24, delete "(S35)" and insert -- (S35). --, therefor.

In the Claims

In Column 11, Line 67, in Claim 1, delete "comprising;" and insert -- comprising: --, therefor.

In Column 12, Line 4, in Claim 1, delete "is a based" and insert -- is based --, therefor.

In Column 12, Line 53, in Claim 12, delete "Wireless" and insert -- A Wireless --, therefor.

In Column 12, Line 67, in Claim 12, before "communications", delete "detected".